F. W. LANE.
Device for Cutting Off Weeds, &c., Under Water.

No. 223,521. Patented Jan. 13, 1880.

Witnesses:
J. W. Garner
Wm. W. Mortimer

Inventor:
Fred. W. Lane,
per
Leman & Wilson,
Atty

UNITED STATES PATENT OFFICE.

FREDERICK W. LANE, OF CHICAGO, ILLINOIS, ASSIGNOR TO CHARLES B. SHEDD, OF SAME PLACE.

DEVICE FOR CUTTING OFF WEEDS, &c., UNDER WATER.

SPECIFICATION forming part of Letters Patent No. 223,521, dated January 13, 1880.

Application filed October 16, 1879.

*To all whom it may concern:*

Be it known that I, FREDERICK W. LANE, of Chicago, in the county of Cook and State of Illinois, have invented certain new and useful Improvements in Devices for Cutting off Weeds, Grass, Rushes, &c., under Water; and I do hereby declare the following to be a full, clear, and exact description of the invention, such as will enable others skilled in the art to which it pertains to make and use it, reference being had to the accompanying drawings, which form part of this specification.

My invention relates to an improved machine for cutting grass under the surface of the water; and it consists in attaching to the side of the boat a vertically-adjustable frame which carries the cutting apparatus that is operated from the deck of the boat, whereby as the boat is moved forward all grass and weeds growing in the water can be cut off at any desired depth below the surface, so that they will not spoil the ice that is formed on the water during the winter, as will be more fully described hereinafter.

Figure 1:
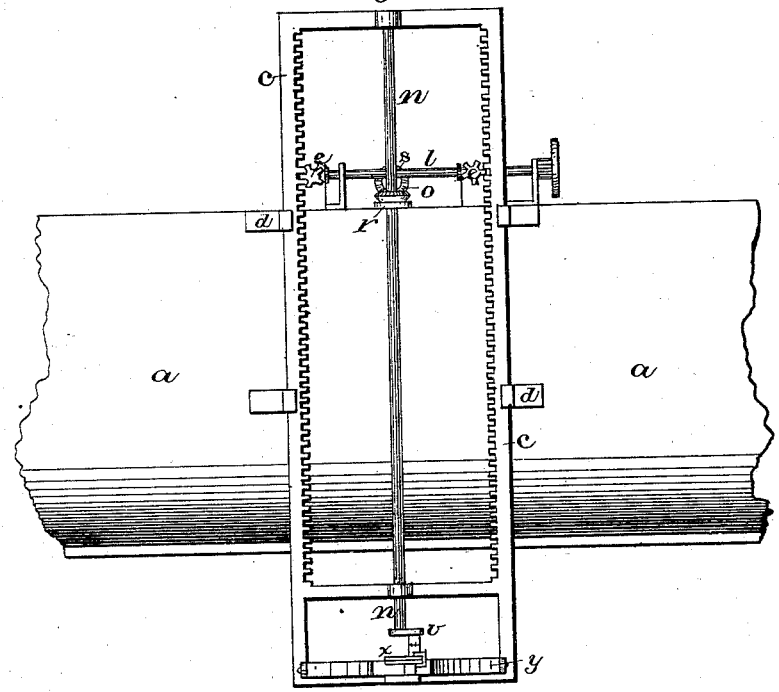
Figure 2:
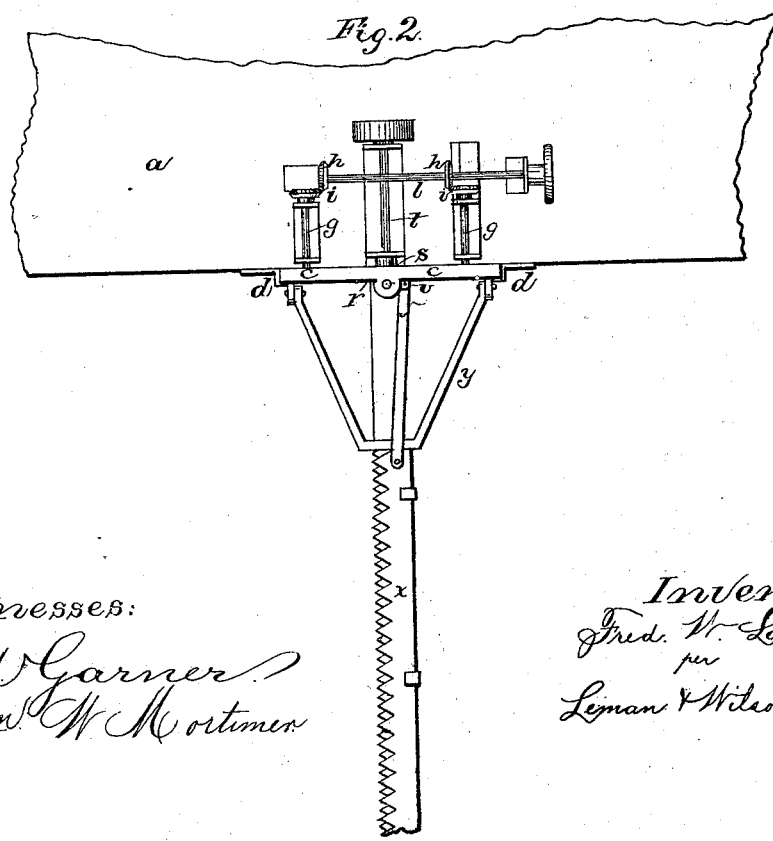

Figure 1 is a side elevation of my invention, and Fig. 2 is a plan view of the same.

$a$ represents a boat of any desired construction, having the rectangular frame $c$ attached to its side, by means of the guides $d$, in such a manner that the frame can be raised and lowered at will. The two inner side edges of this frame are toothed, so as to mesh with the pinions $e$ on the shafts $g$, which shafts are also provided with the beveled gears $i$ on their inner ends, to mesh with similar gears $h$ on the shaft $l$. By turning the shaft $l$ the frame $c$ can be raised or lowered at will, for the purpose of regulating the distance the cutting apparatus shall operate under the water. In the center of this frame is journaled the shaft $n$, which has a spline running its full length, and which shaft, as it moves vertically with the frame, passes through the beveled gear $o$, which is swiveled in the outer end of the bearing $r$. This wheel receives its motion from the beveled gear $s$ on the outer end of the shaft $t$, which shaft is operated either by an engine on the boat or by any other known means. As the gear $o$ revolves it turns the shaft $n$, which has a crank, $v$, formed on its lower end for operating the cutting apparatus $x$.

This cutting apparatus may consist of any of the known devices used on mowers, and is secured to the folding frame $y$, so that it can be closed up against the side of the boat when not in use.

The great trouble ice-men have always had to contend against is that where the water is shallow the grass and weeds growing in the water ruin the ice, so that it is wholly unfit for common uses. By means of my invention these weeds and grasses can be cut away almost as readily as if they were growing in a field, and thus large tracts of ground that are covered with shallow water can be made valuable during the winter months.

My invention may also be used for clearing rivers and channels of weeds, grass, rushes, and the like, so as to allow the passage of boats, or to prevent malaria, or for other purposes.

Instead of the crank to operate the cutting apparatus, any other known devices may be used instead; and instead of the racks and pinions to raise and lower the frame levers or other means may be employed.

Having thus described my invention, I claim—

The combination of a boat, the vertically-moving frame $c$ secured thereto, and a mechanism for moving it, the shaft $n$, journaled in the frame and made to operate the cutter-bar, and a mechanism for revolving the shaft, substantially as shown.

In testimony that I claim the foregoing I have hereunto set my hand this 2d day of October, 1879.

FREDERICK W. LANE.

Witnesses:
CHARLES P. WILSON,
NOAH BARNES.